Feb. 18, 1958   R. B. LYONS   2,823,445
MACHINE TOOL WITH ROTATABLE HEADSTOCK
Filed May 31, 1955   3 Sheets-Sheet 1
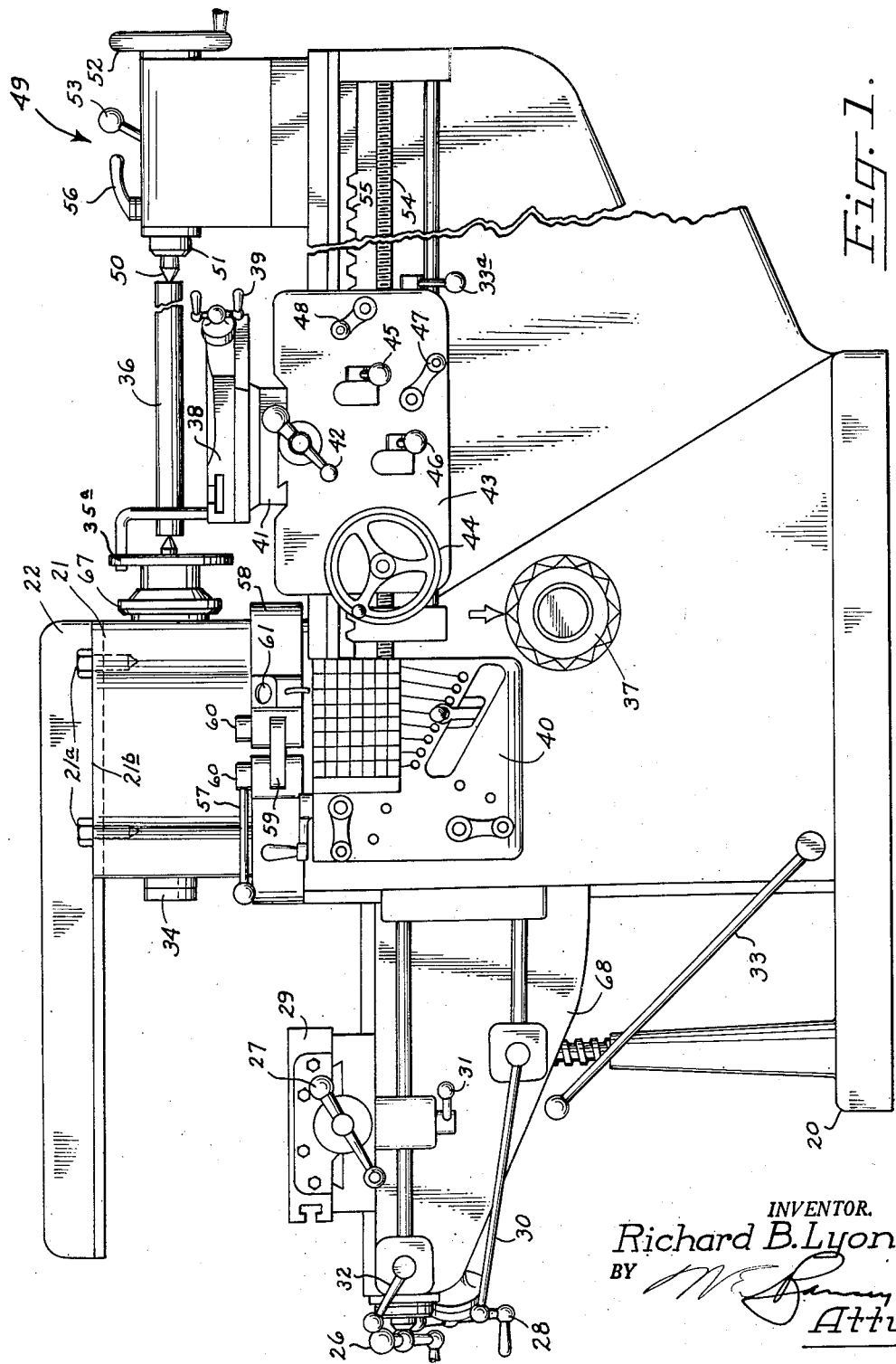
Fig. 1.
INVENTOR.
Richard B. Lyons
BY
Atty.

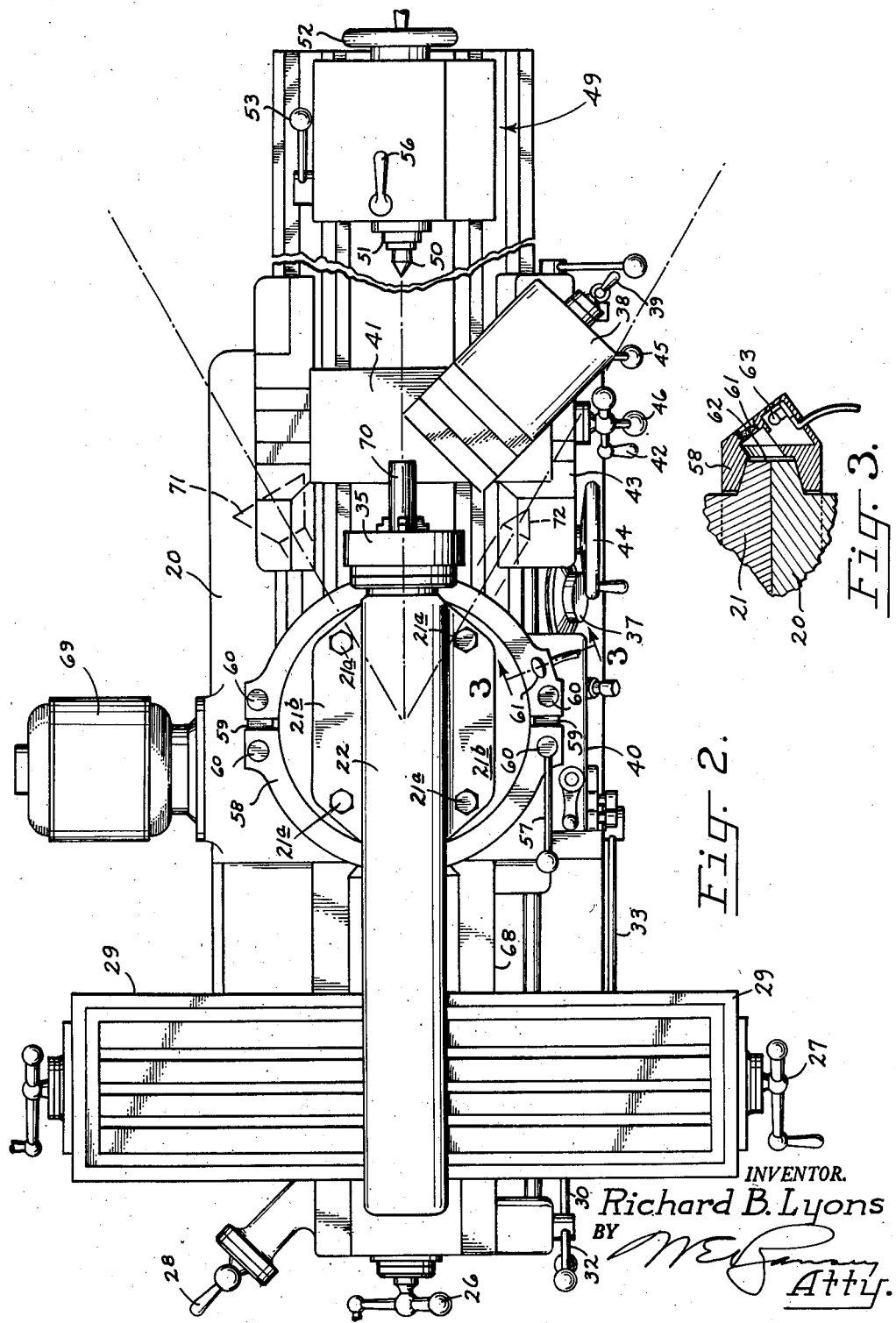

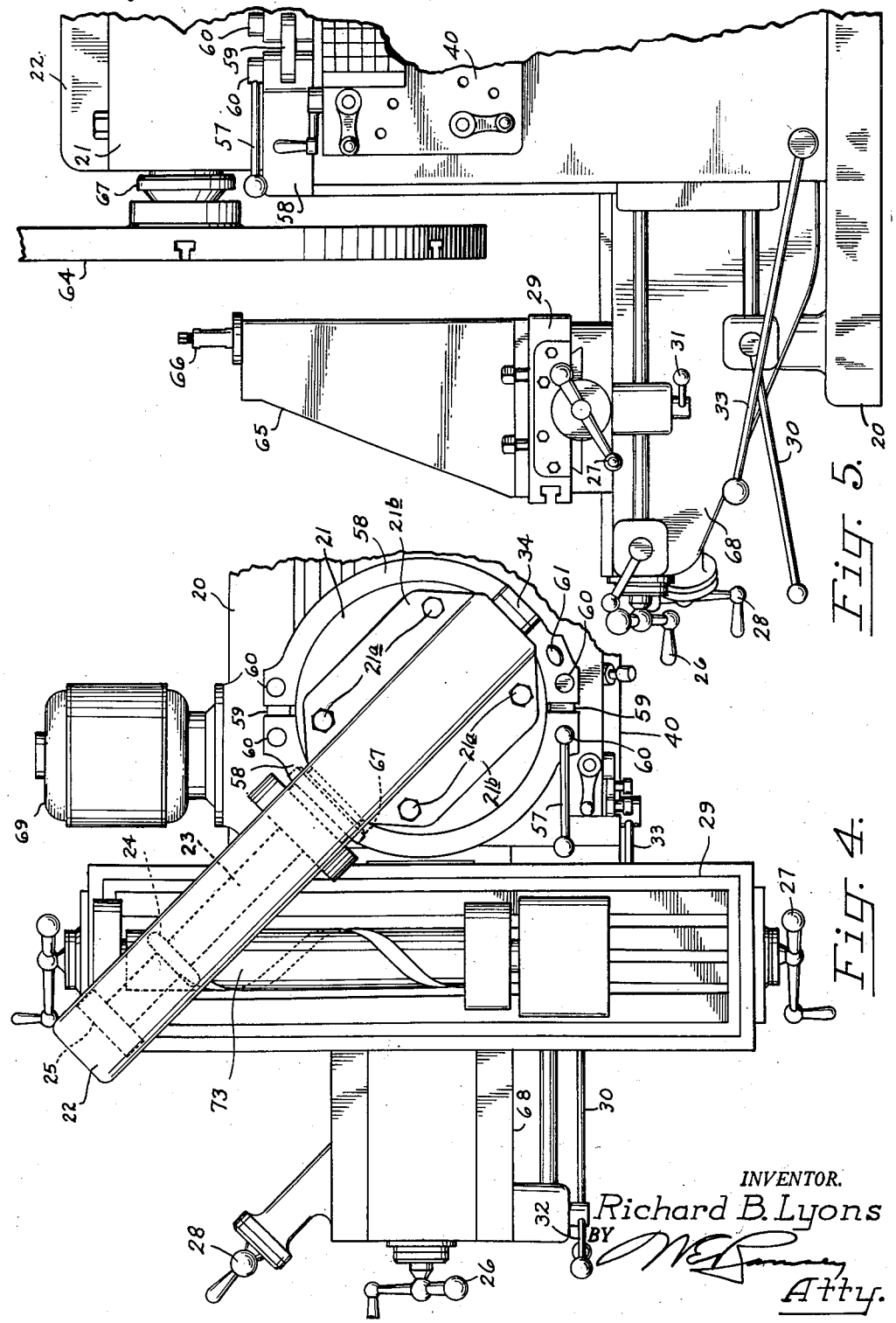

United States Patent Office 2,823,445
Patented Feb. 18, 1958

2,823,445

MACHINE TOOL WITH ROTATABLE HEADSTOCK

Richard B. Lyons, Portland, Oreg.

Application May 31, 1955, Serial No. 511,919

8 Claims. (Cl. 29—27)

This invention relates to a compound, power operated machine tool combining a knee type milling machine, an engine lathe, and a large diameter chucking lathe with a single headstock.

One object of my invention is to provide a machine tool having a fixed base member with both an engine lathe and a knee type milling machine served by a common rotatable headstock and spindle.

Another object of my invention is to provide a compound machine tool of the above type which can be fabricated at a decreased cost without sacrificing the ability to perform such diverse operations as helical milling and taper turning.

The machine tool of the instant invention finds a primary utility aboard ship and in home or basement work shops where two factors dictate the structural features and requirements. The first of these factors is one of space limitation, heretofore governed by the total space occupied by a knee type milling machine, an engine lathe, and a large diameter chucking lathe. The second factor is one of cost, heretofore governed by the additive expense of purchasing a knee type milling machine, an engine lathe, and a large diameter chucking lathe. By combining these three types of machines on a common base and by serving all three with a common rotative head, I not only have reduced the space occupied by the machine but further have lowered the overall cost without sacrificing the ability of the compound machine to perform any and all operations capable of performance by the three individual machines. The provision of a machine tool having these advantages is one object of my invention.

In summary description, my tool includes an elongated fixed base member having a headstock which is mounted for selective rotation with respect thereto about a vertical axis through a full 360° circle. A releasable clamp serves to secure the headstock in selective rotative position with respect to the base and a power driven spindle is journaled within the headstock for rotation about a horizontal axis. In addition, the fixed base member supports both a full size engine lathe with a work bed and a full size knee type milling machine. The bed of the lathe and the knee of the milling machine lie on opposite sides of the headsock and an elongated overarm support member for a milling arbor is adjustable lineally of the headstock in a horizontal direction parallel to the rotative axis of the spindle.

Illustrative of one advantage of the above construction, I mount a laterally fixed tailstock on the work bed of the lathe for selective longitudinal movement toward and away from the rotatable headstock. Taper turning is possible with this laterally fixed tailstock by rotating the headstock to selective rotative positions with respect to the tailstock. In this manner, I preserve the utility of the lathe with respect to taper turning yet eliminate the need for and the expense of providing an additional lateral adjustment upon the tailstock. The provision of this structure is another object of my invention.

In the milling machine portion of my invention, I mount a radially fixed bed upon the knee for selective vertical and horizontal movement with respect to the rotatable headstock. By adjusting the headstock to various rotative positions, I am able to mill a helix without the need for and the expense of providing a radial adjustment of the bed itself. Further, by dropping the bed to a lower position and adding a tool block, I am able to effect a chucking lathe setup for large diameter work adjacent the milling machine portion of the tool. These structures are saving of space and cost as above detailed and their provision is a further object of my invention.

Yet another object of my invention is to provide a visual indicia means carried in part by the headstock and in part by the fixed frame member for indicating to the machinist the precise rotative position of the headstock relative to the base.

Still another object of my invention is to provide a compound machine tool of the above described type with an elongated overarm support member for a milling arbor, said support member being adjustable lineally of the headstock in a horizontal direction parallel to the rotative axis of the spindle for use with a milling cutter and in order to allow the support member to be retracted out of the way when not in use.

These and other objects and advantages of my invention will become apparent during consideration of the following detailed description, taken in conjunction with the accompanying drawings, wherein:

Fig. 1 is a partially shortened side view showing the milling machine portion of my tool to the left and the engine lathe portion to the right;

Fig. 2 is a partially shortened top view showing a taper turning operation with respect to the engine lathe portion of the tool;

Fig. 3 is a cross section detail, taken substantially on the line 3—3 of Fig. 2, showing the magnifying glass and light for the visual indicia means indicating the precise rotative position of the headstock relative to the base;

Fig. 4 is a top view of the milling machine portion per se with the milling cutter being used to form a helix in a piece of cylindrical stock; and Fig. 5 is a partial side view showing a chucking lathe setup on the milling machine portion of the tool.

Referring initially to Fig. 1 of the drawings, an elongated fixed base member 20 is provided with a headstock 21 which is mounted for selective rotation with respect thereto about a vertical axis through a full 360°. This headstock carries an elongated overarm supporting member 22 for a milling arbor, the support being mounted parallel to a power driven spindle which rotates about a horizontal axis within the headstock. In Fig. 1, the thrust bearing 34 at one end of the spindle is shown, the spindle itself bearing the reference numeral 67.

In the milling machine portion of the tool, shown at the left in Fig. 1 and Fig. 4, the overarm support 22 carries an outboard bearing 25 in which is journaled an arbor 23. This arbor is provided with a conventional milling cutter 24 and it works above a milling table bearing the reference numeral 29. Various adjustment mechanisms and controls common to a knee type milling machine include the horizontal table adjustments 26 and 27, the vertical table adjustment 28, the vertical power feed control 30, and the two horizontal power feed controls 31 and 32. Rotation of the spindle in the headstock is controlled by a lever 33 with a duplicate control being provided adjacent the right or engine lathe portion of the tool by the duplicate contral lever 33a.

Referring now to the engine lathe portion of the tool, the spindle 67 carries a chuck 35a in which a piece of cylindrical stock or work 36 is held. 37 designates a spindle speed control and 38 a compound slide for holding the tool itself. A feed adjustment for this compound slide is indicated at 39 and a feed and screw pitch selector box at 40. Since this selector box is of conventional construction, the details thereof will not be discussed. Suffice to say, the four levers on this box provide a feed and screw pitch selection of adequate range for the work intended to be performed.

The compound slide 38 is mounted upon a cross slide 41 having a cross slide adjustment 42. In addition, the lathe is provided with an apron 43, a hand wheel control for the lathe carriage 44 and a cross side feed lever 45. Reference numeral 46 designates a conventional carriage feed lever whereas 47 designates a feed reversing lever. The lead screw half nut lever is shown at 48 and the tailstock is designated generally by the arrowed lead line 49. In detail, the tailstock includes a center 50, a quill 51, a quill adjustment wheel 52, and a tailstock locking lever 53.

The lead screw for the lathe is indicated at 54 and the carriage rack at 55. At 56, I have shown a tailstock quill locking lever and, at 57, a headstock clamping lever. The latter element brings the description to a novel portion of the machine tool which now will be described in greater detail.

To the above end, a clamping ring 58 overlies the plane in which the headstock 21 rotates upon the base 20. This ring is provided in two arcuate halves, the two halves being joined by links 59. Eccentric pins 60 carry the links 59. As indicated in Fig. 2 and in the cross section of Fig. 3, these pins act with the links and rings to define a releasable eccentric clamp mechanism for securing the headstock 21 in selected rotative positions with respect to the fixed base member 20. As also shown in Fig. 3, a portion of one of the clamping rings 58 is pierced by an aperture in which I mount a magnifying glass 61. This glass cooperates with an electric lamp or light 63 to allow readings to be made of indicia 62 formed upon the headstock and base member. A fixed reference mark is scribed upon one of these elements and reference marks indicating rotational degrees and minutes are scribed upon the other. By glancing through the magnifying glass 61, the machinist is provided with a visual indicia which indicates the precise rotative position of the headstock relative to the base. Upon achieving a desired position, the lever 57 is tightened thereby causing the eccentric pins 60 and links 59 to squeeze the rings 58 about the joinder plane of the headstock and base.

In Fig. 5, I have shown a large diameter chucking lathe setup in which the spindle 67 carries a face plate 64. In addition, a tool block 65 having a tool post 66 has been mounted upon the aforementioned milling table 29. The knee of the milling machine itself is indicated by the reference numeral 68 and an electric drive motor of constant speed bears the reference numeral 69. As will be apparent, a gear change mechanism is located between the shaft of the motor itself and the final drive which terminates with the spindle 67. An exemplary final drive may include a pair of 45° miter gears. These lead the rotation from a vertical axis to the horizontal axis about which the spindle 67 rotates. The precise details of this gearing are not, however, of particular importance since the only requirement is that the headstock 21 be capable of a full 360° rotation while still allowing for a power supply to the spindle 67 and various gear arrangements will present themselves to one skilled in the machine tool arts. In similar manner, it will be noted that the overarm support 22 can be shifted back and forth from the position shown in Fig. 4 to that shown in Fig. 5. This is accomplished by mounting the support upon dovetails and providing a pair of clamping members 21b with cap screws 21a or a tightening mechanism of any conventional construction. When the clamp is loose, the support can be moved over the dovetails and, thereinafter, clamped in the new position.

As will be apparent from an inspection of the drawings, the machine is capable of use as an engine lathe, a chucking lathe, or a knee type milling machine. As an inspection of Fig. 1 will make apparent, the lathe can turn long tapers without the use of a laterally adjustable tailstock simply by adjusting the rotative position of the headstock. In Fig. 1, a piece of cylindrical work is indicated at 36 in position between the tailstock 49 and the chuck 35a. This latter setup is exemplary of a typical engine lathe operation and the mode of operation thus will be apparent from the drawings. Suffice to say, the lathe is full size and is capable of accomplishing any and all work accomplished by a comparable conventional engine lathe having a laterally adjustable tailstock.

Referring to Fig. 2, I have shown a short piece of work 70 in full lines in place within the chuck 35 and, in dashed outline, a diverging taper 71 and a converging taper 72. Conventionally, these tapers are turned by providing a so-called "taper attachment" for the lathe. With the instant invention, however, rotation of the headstock 21 allows the tapers to be turned without a taper attachment. This is a substantial saving since taper attachments are complex, expensive items. In similar manner, and because of the same rotative function of the headstock 21, I am enabled to construct the tailstock 49 without a lateral adjustment. This provides a laterally fixed tailstock which is less expensive and yet, by adjusting the headstock in rotation, the same work, including the turning of long tapers, can be accomplished as with a conventional engine lathe.

In Fig. 4, I have shown the milling machine portion of the tool set up to cut a helix in a cylindrical piece of work 73. Here, the overarm support 22 has been extended so as to overlie the spindle 67. An arbor 23 then has been mounted in an appropriate bearing such as that indicated at 25 and a milling tool 24 has been secured to the arbor. As previously noted, the milling machine bed 29 is fixed radially and cannot be rotated as can the more complex and thus more costly beds utilized in prior art knee type milling machines which are equipped to cut a helix. The helix shown in Fig. 4 can be cut in the piece of work 73 with my inventive mechanism merely by adjusting the headstock 21 in rotation. To secure a precise rotational position, the headstock clamping lever 57 is loosened and the headstock 21 rotated by hand until a reading through the glass 61 provides an indicia that the desired rotative position has been reached. Thereinafter, the headstock clamping lever 57 once more is tightened and the work is allowed to proceed with the cutter in an appropriate position to cut a helix.

In Fig. 5, I have shown a chucking lathe setup for large diameter work. The tool block 65 has been mounted upon the milling table 29 with the tool post 66 in appropriate position. Further, the large circular face plate 64 has been mounted upon the spindle 67 and the knee 68 has been dropped to a low vertical position to provide the necessary clearance. In this particular use, the overarm support 22 has been fully retracted so as not to interfere with the face plate 64 and the work in progress and the headstock has been adjusted so the face plate 64 will clear the adjacent portions of the tool.

In summary of the above use, it will be seen that my tool has eliminated the need for a tapering attachment on the engine lathe, for a lateral adjustment of the tailstock 49, for a radial adjustment of the milling table 29, and for separate spindles and headstocks. Each of these is a cost saving factor as will be appreciated by those skilled in the art. At the same time, the tool can perform any and all of the diverse functions normally performed by a full size engine lathe, a full size knee type milling machine, and a light weight large diameter chucking lathe. The tool thus will be seen to possess utility aboard ship or elsewhere in locations where the space available for machine tools is at a premium. Similarly, the tool is well suited to the requirements of the home workshop since the overall cost is much less than the cost of the separate tapering attachment, milling machine, engine lathe, and large diameter chucking lathe. In combination, these advantages flow from the provision of a rotatable headstock related as described to oppositely disposed milling machine and lathe structures.

I claim:

1. A machine tool, comprising an elongated fixed base member having a headstock means releasably clamped in position and mounted for selective rotation with respect to the base about a vertical axis through a full 360°, and a power driven spindle means protruding from one end only of said headstock and mounted for rotation about a horizontal axis, said fixed base member supporting both an engine lathe with a work bed and a knee type milling machine, the bed of said lathe and the knee of said milling machine lying on opposite sides of said headstock, said spindle means being sweepable over and being operatively located with relation to either said lathe bed and said milling machine.

2. A machine tool, comprising an elongated fixed base member having a headstock mounted for selective rotation with respect thereto, said fixed base member supporting both an engine lathe with a work bed and a knee type milling machine, the bed of said lathe and the knee of said milling machine lying on opposite sides of said headstock, said spindle means being sweepable over and being operatively located with relation to either said lathe bed and said milling machine, and a laterally fixed tailstock mounted upon the work bed of said lathe for selective longitudinal movement toward and away from said rotatable headstock.

3. A machine tool, comprising in combination an elongated fixed base member having a headstock mounted for selective rotation with respect thereto about a vertical axis, said fixed base member supporting both an engine lathe with a work bed and a knee type milling machine, the bed of said lathe and the knee of said milling machine lying in a common vertical plane on opposite sides of said headstock, said spindle means being sweepable over and being operatively located with relation to either said lathe bed and said milling machine, and a radially fixed bed mounted upon the knee of said milling machine for selective vertical and horizontal movement only with respect to said rotatable headstock.

4. A machine tool, comprising an elongated fixed base member having a headstock mounted for selective rotation with respect thereto about a vertical axis, a power driven spindle protruding from and journaled within said headstock for rotation about a horizontal axis, said fixed base member supporting both an engine lathe with a work bed and a knee type milling machine, the bed of said lathe and the knee of said milling machine lying on opposite sides of said headstock, said spindle means being sweepable over and being operatively located with relation to either said lathe bed and said milling machine, a laterally fixed tailstock mounted upon the work bed of said lathe for selective longitudinal movement toward and away from said rotatable headstock, and a radially fixed bed mounted upon the knee of said milling machine for selective vertical and horizontal movement with respect to said rotatable headstock.

5. A machine tool, comprising an elongated fixed base member having a headstock mounted for selective rotation with respect thereto, said fixed base member supporting both an engine lathe with a work bed and a knee type milling machine, the bed of said lathe and the knee of said milling machine lying on opposite sides of said headstock, said spindle means being sweepable over and being operatively located with relation to either said lathe bed and said milling machine, a releasable clamp means for securing said headstock in selected rotative positions with respect to said base, a power driven spindle protruding from and journaled within said headstock for rotation about a horizontal axis, and an elongated overarm support member mounted parallel to said spindle upon said headstock for rotation with and for longitudinal movement with respect to the headstock.

6. In combination, an elongated fixed base member for a compound machine tool, said base member carrying a single headstock which is mounted for selective rotation with respect thereto about a vertical axis, said fixed base member also supporting both a full size engine lathe with a work bed and a full size knee type milling machine, the bed of said lathe and the knee of said milling machine lying on opposite sides of said headstock, said spindle means being sweepable over and being operatively located with relation to either said lathe bed and said milling machine, a visual indicia means carried in part by both said headstock and said base for indicating the precise rotative position of the headstock relative to the base, a power driven spindle protruding from and journaled within said headstock for rotation about a horizontal axis, and an elongated overarm support member for a milling arbor mounted parallel to said spindle upon said headstock for rotation with the headstock, said overarm support being adjustable lineally of said headstock in a horizontal direction parallel to the rotative axis of said spindle.

7. A machine tool, comprising in combination an elongated fixed base member having a single headstock mounted for selective rotation with respect thereto about a vertical axis, a releasable eccentric clamp means for securing said headstock in selected rotative positions with respect to said base, a power driven spindle protruding from and journaled within said headstock for rotation about a horizontal axis, an elongated overarm support member for a milling arbor mounted parallel to said spindle upon said headstock for rotation with the headstock, said fixed base member supporting both an engine lathe with a work bed and a knee type milling machine, the bed of said lathe and the knee of said milling machine lying on opposite sides of said headstock, said spindle means being sweepable over and being operatively located with relation to either said lathe bed and said milling machine, and a laterally fixed tailstock mounted upon the work bed of said lathe for selective longitudinal movement toward and away from said rotatable headstock.

8. A machine tool, comprising in combination an elongated fixed base member having a headstock mounted for selective rotation with respect thereto about a vertical axis through a full 360°, a releasable clamp means for securing said headstock in selected rotative positions with respect to said base, a visual indicia means carried in part by both said headstock and said base and including a magnifying glass, a light and markings for indicating the precise rotative position of the headstock relative to the base, a power driven spindle protruding from and journaled within said headstock for rotation about a horizontal axis, an elongated overarm support member for a milling arbor mounted parallel to said spindle upon said headstock for rotation with the headstock, said overarm support being adjustable lineally of said headstock in a horizontal direction parallel to the rotative axis of said spindle, said fixed base member supporting both a full size engine lathe with a work bed and a full size knee type milling machine, the bed of said lathe and the knee of said milling machine lying in a common vertical plane on opposite sides of said headstock, and a radially fixed bed mounted upon the knee of said milling machine for selective vertical and horizontal movement only with respect to said rotatable headstock.

(References on following page)

References Cited in the file of this patent

UNITED STATES PATENTS

| | | |
|---|---|---|
| 680,167 | Nitterauer | Aug. 6, 1901 |
| 1,144,744 | Wheeler | June 29, 1915 |
| 1,269,727 | Metz | June 18, 1918 |
| 1,620,522 | Dalton | Mar. 8, 1927 |
| 2,341,061 | Rhodes | Feb. 8, 1944 |

FOREIGN PATENTS

| | | |
|---|---|---|
| 352,344 | France | Mar. 13, 1905 |